July 4, 1950            F. J. WEIR            2,513,438
HOSE CLAMPING TOOL
Filed Feb. 14, 1948
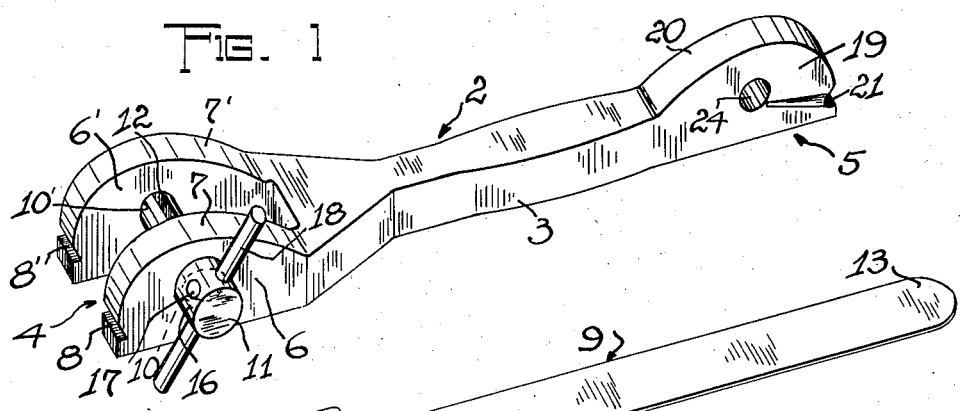
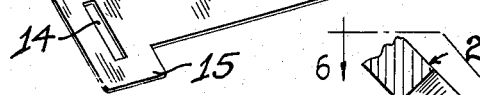
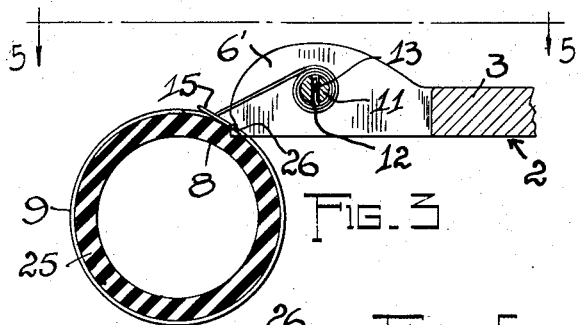
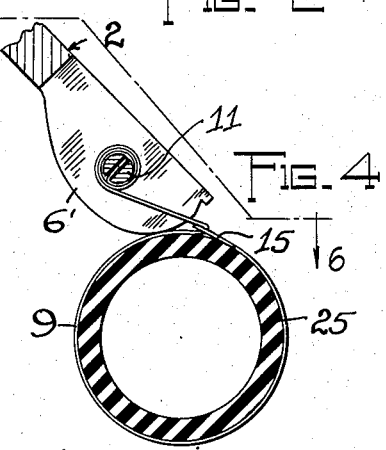
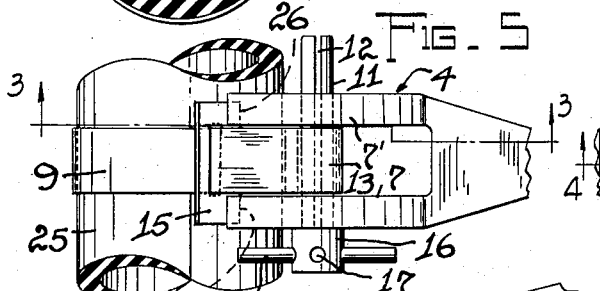
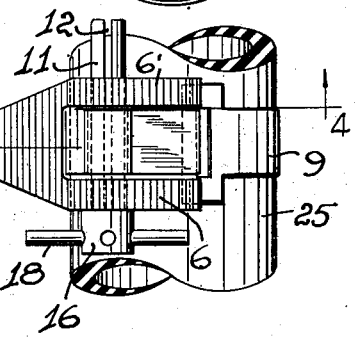
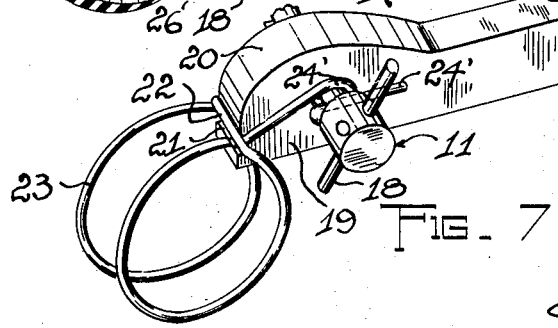
INVENTOR.
FRANK J. WEIR
BY
Gustav A. Uboeff
ATT Patented July 4, 1950

2,513,438

UNITED STATES PATENT OFFICE 2,513,438

HOSE CLAMPING TOOL

Frank J. Weir, Lakewood, Ohio

Application February 14, 1948, Serial No. 8,429

2 Claims. (Cl. 81—9.3)

This invention relates to tools for securing flexible hose by means of metal strips, bands, or wires to pipes, nozzles, nipples, couplings and the like, and has for its primary object to provide, in a manner hereinafter set forth, a tool of this character comprising a novel construction and arrangement for expeditiously applying a hose clamp in the form of a metal strap or wire binder tautly around a hose and securing the strap or wire binder under tension to said hose by tilting the tool backwardly while rolling on the hose to produce a sharp bend in the strap or wire binder prior to removal of the tool.

Another important object of the invention is the provision of a tool of the aforementioned character which includes cam-shaped head portions for conveniently securing a metal strap or wire structure in tensioned condition to a hose by swinging the tool toward the hose and contacting such hose with the respective cam-shaped head portion to produce a sharp bend in the tensioned strap or wire binder prior to the removal of the tool.

A further object of the invention is the provision of a tool of the aforementioned character which includes grooved seating means for straps or wire structures constructed to properly hold metal straps or wire binders while forcibly drawn around a flexible hose prior to bending of the straps or wire binders by tilting the tool toward the hose.

Other objects of the invention are to provide a tool of the type referred to above which will be of simple, durable and compact construction, is high in efficiency and reliable in use and may be manufactured at low cost.

The above and additional objects and novel features of construction, combination and relations of parts by which the objects in view have been attained, will appear and are set forth in detail in the course of the following specification. The drawing accompanying and forming part of the specification illustrates a practical embodiment of the invention, but it will be apparent as the specification proceeds that the structure of the invention may be modified and changed in various ways without departure from the true spirit and scope of the invention.

In the drawing:

Fig. 1 is a perspective view of a hose clamping tool constructed in accordance with the invention.

Fig. 2 is a perspective view of a clamping band to be used with the tool shown in Fig. 1;

Fig. 3 is a sectional view showing the hose clamping tool in use, the section being taken on line 3—3 of Fig. 5;

Fig. 4 is a sectional view similar to Fig. 3 with the clamping tool swung toward the hose into engagement of its cam portion with the hose to produce a sharp bend in the tensioned clamping band, the section being taken on line 4—4 of Fig. 6;

Fig. 5 is a plan view of Fig. 3 taken from line 5—5 in Fig. 3;

Fig. 6 is a plan view of Fig. 4 taken from line 6—6 in Fig. 4; and

Fig. 7 is a perspective view of the hose clamping tool when used in conjunction with a U-shaped wire binder.

Referring now in detail to the exemplified form of the invention shown in the drawing, reference numeral 2 denotes a hose clamping tool embodying a shank portion 3 provided at its opposite ends with clamping heads 4 and 5, clamping head 4 being used for clamping bands and clamping head 5 for U-shaped wire binders.

The clamping head 4 is fork-shaped and embodies two identically shaped, laterally spaced head members 6 and 6' spaced from each other a distance equal to or larger than the width of the clamping band to be applied to a hose by the tool. The head members include curved upper faces 7, 7' and form cam members which are provided at their front faces with slots 8, 8' adapted to seat a clamping band 9 such as disclosed in Fig. 2. Head members 6, 6' have extended therethrough aligned cross bores 10, 10' which removably seat a headed winding key or mandrel 11 adapted to tighten a clamping band. This winding key is longitudinally slotted to provide a slot 12 to be used for extending therethrough the free end portion 13 of clamping band 9 when such band is folded around a hose and has extended end portion 13 through the narrow slot 14 in head portion 15 of clamping band 9 as will be later described. The headed winding key preferably includes a head portion 16 provided with a number of cross passages 17 adapted to removably seat a turning pin or similar member 18.

The clamping head portion 5 is designed for use with U-shaped wire binders. This head portion includes a body 19 provided with a curved upper face 20 shaping such body to a cam member. The front face of head portion 5 is recessed and forms a seat 21 for the cross member 22 of a U-shaped wire binder 23 (see Fig. 7). Body 19 has extended therethrough a cross bore 24 adapted to freely removably seat winding key 11 and tighten U-shaped wire binder 23 when folded around a hose, then extended with the free ends 24' under the cross member 22 of wire binder 23 and interlocked with its free ends with winding key 11 by threading the ends 24' through slot 12 in winding key 11.

In the use of the above described tool, clamping band 9 is folded around a flexible hose 25 and the free end portion 13 of such band is sleeved through the narrow slot 14 in head portion 15 of the clamping band. In this position of the band, tool 2 is placed so as to engage with its slots 8 the inner edges 26 of head portion 15 so that free end portion 13 of the band extends between the head members 6, 6' and can readily be inserted into the slot 12 of winding key 11 when such key is shifted partly through the aligned cross bores 10. In this position tool 2 when actuated by rotation of its winding key 11 effects tightening of clamping band 9 around hose 25 and is held in proper working position by engagement of slots 8, 8' with the inner edges 26 of head portion 15. After tightening operations tool 2 is shifted in a swinging motion toward hose 25 to effect sharp bending of the end portion of the clamping band for hook-like interlocking of the head portion 15 with the end portion 13. During this swinging action clamping band 9 is held under tension by engagement of the rounded upper surfaces 7 with hose 25, which faces roll on hose 25 and retain the desired tension in clamping band 9 during locking operations.

Having thus described my invention:

What I claim is:

1. A hose clamping tool comprising an elongated body, a clamping head integrally extended from one end of said body, said clamping head including a cam-shaped curved top portion with a recessed seat at its front end adjacent to the bottom portion of said clamping head and rotatable means crosswise of said head adapted to tighten a clamping band having a slotted end around a hose when such band has its other end secured to said rotatable means and rests its slotted end in the recessed seat of the clamping head.

2. A hose clamping tool comprising an elongated body, a fork-shaped clamping head integrally extended from one end of said body, said clamping head including laterally spaced head portions with cam-shaped curved tops and recessed seats at its front ends adjacent to the bottoms of said head portions, and rotatable means crosswise of said head portions extended through aligned bores therein and adapted to tighten a clamping band including a slotted end around a hose and coupled with said rotatable means when such band has its other end extended through the slotted end and coupled with the rotatable means and rests with its slotted end in the recessed seats of the head portions.

FRANK J. WEIR.

REFERENCES CITED

The following references are of record in the file of this patent:

UNITED STATES PATENTS

| Number | Name | Date |
| --- | --- | --- |
| 935,648 | Wieder | Feb. 28, 1911 |
| 1,353,338 | Gunn | Sept. 21, 1920 |
| 1,442,402 | Gunn | Jan. 16, 1923 |
| 2,075,720 | Hoffmann | Mar. 30, 1937 |
| 2,208,114 | Campbell | July 16, 1940 |